Feb. 25, 1964 J. B. ORR 3,122,256
CAP SEAL
Filed March 9, 1959

INVENTOR.
John B. Orr
BY Green, McCallister & Miller
HIS ATTORNEYS

United States Patent Office 3,122,256
Patented Feb. 25, 1964

3,122,256
CAP SEAL
John B. Orr, R.F.D. 3, Great Barrington, Mass.
Filed Mar. 9, 1959, Ser. No. 798,130
1 Claim. (Cl. 215—43)

This invention relates to the closing or sealing-off of open-mouth jars or containers that are made of a relatively soft material, such as an expanded resin, and particularly, to the application and sealing of a lid for such a container or jar.

There has been an increasing use of expanded resins or plastics, such as polystyrene, that may be molded or shaped into useful articles, such as containers or jars, by employing expandable resin beads or pre-expanded beads. This may be accomplished by applying steam at a suitable pressure of about 30 pounds per square inch to the resin beads in a mold, thus heating them and expanding them to form an inherent body in the nature of an article such as a container. Containers of this type are much less expensive than glass containers, are lighter in weight, and can be produced in pleasing shapes and colors. However, the expanded material is by nature somewhat soft and spongy, such that it can be readily marked on its surface with a fingernail. I have also determined that (see FIGURE 8 of the drawings) an expanded resin body, part or element is composed of small, spherical beads of material which have been caused to expand by the action of the steam during molding, and which have been joined together in a welding cohesion at their contacting surfaces. However, examination of the surface under magnification indicates that minute crevices or interstices exist between adjacent adherent beads which appear along the surface of the resinous element, possibly due to the inability of the spherical beads to assume a cubic shape at the surface interface. Because of these factors, difficulty has been encountered in obtaining a tight seal between the rim of the jar or container and the lid which is employed, as by screwing it on to close off the container. I have found that the threads of such a container are not rigid enough to obtain a high enough screw-on pressure to provide an effective fluid-tight or leakproof seal between the article and the lid.

Packaging companies have desired to use containers of this type for holding various types of materials which may be in the nature of a liquid, a vaporizable material, a cream, etc. However, previous to my present invention, the use of such containers has been limited from a standpoint of the liquid vapor content, such as the water content, due to the heretofore relatively high rate of vapor and moisture transmission from the joint formed between the container and its lid.

It has thus been an object of my invention to discover and evaluate pertinent factors entering into providing of a fluid-tight seal between an expanded resin container and its lid;

Another object has been to provide an improved type of sealing combination between a lid and a container, so as to minimize liquid or vapor leakage of the contents of the container to the atmosphere;

A further object of my invention has been to devise an improved method and structure for closing off an open end portion of a container or jar, such as of an expanded plastic or resinous type;

A still further object of my invention has been to provide a restricted area seal of an elastic or resilient nature between a container and its lid;

These and other objects of my invention will appear to those skilled in the art from the illustrated embodiment and the description thereof, as well as from the claim.

In the drawings chosen to illustrate my invention, FIGURE 1 is a reduced perspective view in elevation showing a container and its lid in an exploded relationship with each other;

Figure 1:
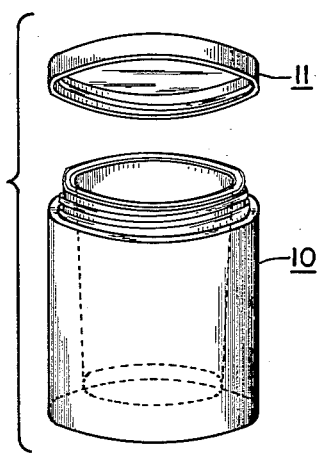
Figure 2:
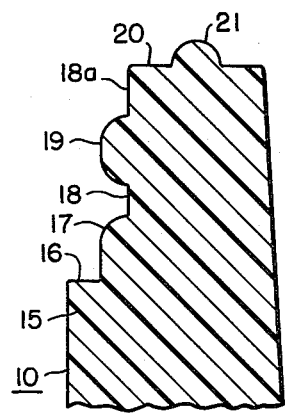
FIGURE 2 is an enlarged and to scale vertical fragmental section through a container at its opend end portion and showing one embodiment of my invention; in this view, a sealing ledge portion of the container is its as-formed or normal shape when a lid has been removed.
Figure 3:
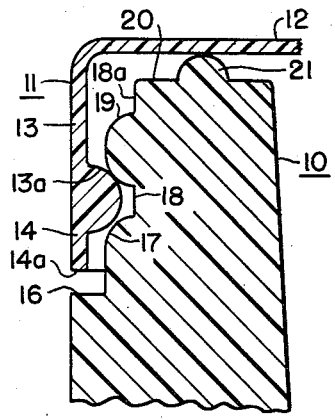
FIGURE 3 is a fragmental view of the same scale of FIGURE 2 showing a lid in an initial relationship with respect to the container mouth or open end portion.
Figure 4:
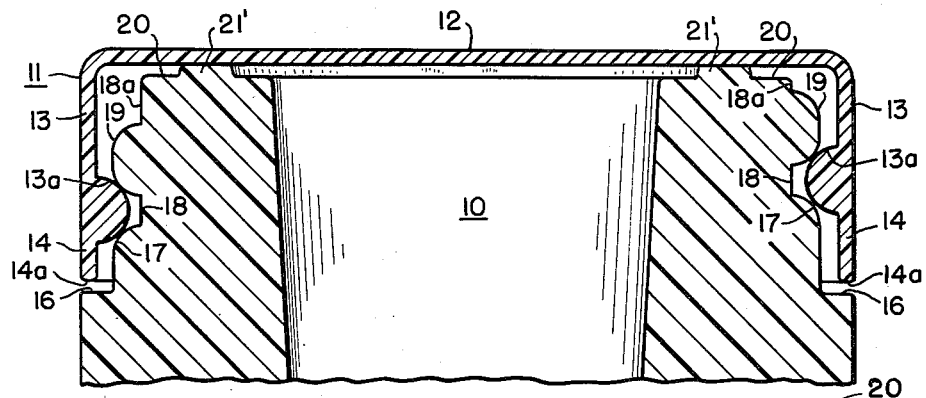
Figure 8:
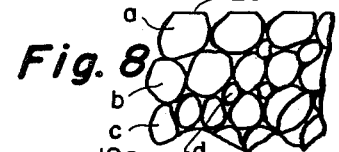
Figure 5:
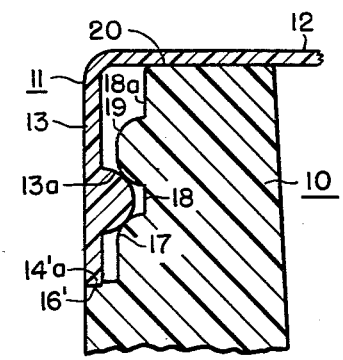
Figure 6:
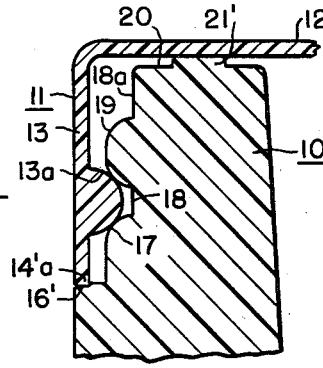
Figure 7:
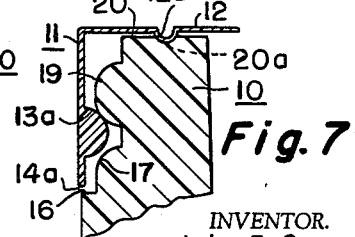

FIGURE 4 is a sectional elevation on the scale of FIGURES 2 and 3 showing the lid of FIGURE 2 in its final sealing and fully turned-on or latched relationship with respect to the container; this view illustrates how the sealing ledge portion of FIGURES 1 and 2 is pressed-in and flatened to provide an increased sealing area and one which is under a constant resilient sealing pressure force and whose effective area, as defined by its peripheral reaches, is substantially less than that of the main rim or lip edge face portion of the container;

FIGURE 5 is a fragmental vertical sectional view on the scale of FIGURES 1 to 4, inclusive, illustrating a modified form or my invention in which the sealing action is accomplished between a side flange of the lid and a bottom or shoulder ledge portion of the open end portion of the container; this view shows the shoulder ledge portion as deformed or pressed inwardly into a full sealing relationship with a rounded edge of the side flange of the lid;

FIGURE 6 is a view similar to and on the scale of FIGURE 5 employing principles of the sealing actions illustrated in the embodiments of FIGURES 4 and 5, wherein both a raised sealing ledge or ridge is employed on the container lip face and a sealing shoulder ledge is employed adjacent an inner terminus of the mouth portion of the container;

FIGURE 7 is a view similar to and on a reduced scale as to FIGURES 5 and 6, illustrating an embodiment of my invention wherein the cap or top portion of the lid element or part is provided with a projection for effecting a seal with a lip face or edge of the container body;

FIGURE 8 is a greatly enlarged fragmental section (under magnification) through the expanded container body of my construction, showing its expanded bead structure.

By means of my invention, I have been able to make a shaped, light-weight, expanded resin container for assembly with a relatively rigid cap or lid which will make possible the use of the container in fields heretofore limited to containers of glass, metal and high-density or heavily compacted resin constructions. As emphasized above, the need has been for an arrangement which will provide a good substantially leak-proof fluid or moisture seal between the joint defined by the lid and the open mouth portion of the container. Such a sealing relationship is particularly important from the standpoint of the saleable life of the contents of the container, and essentially from the standpoint of storage life, so that the material within the container will have a requisite moisture or fluid content when it is purchased by the ultimate consumer.

One of the important factors in solving the problem is based on the discovery that the open end mouth portion should have a suitable thickness or cross section and size of threads or latching portions, to not only give the threads a requisite strength and life, but to avoid breakage of the container at its mouth or sealing neck portion. On the other hand, an offsetting factor was found to rest in the fact that a proper form of sealing joint could not be effected as to the requisite thickness or cross-sectional extent of the open mouth portion when reliance was placed on using the lip edge face in abutting contact with top or cap portion of the lid.

In carrying out my invention, I have been able to further strengthen the mouth or neck portion of the container by providing it with a thickness or section such that it has a better factor of strength with respect to the main body portion and a better strength as to its threads. At the same time, I have been able to obtain a better and fully effective sealing action between the mouth portion and the lid.

I have been able to accomplish this result by providing an immediate outwardly-projecting sealing rim, ridge, ledge portion or annulus which is offset from the usual abutment face or surface of one element or part of a pair of cooperating elements or parts (lid and container), which is so employed as to make a localized, continuous, surface contact with the other element or part of the pair, and which effects a flattening or flattening-out compression on an abutting sealing area of the resinous part or element, such that interstices or crevices between expanded beads are, in effect, eliminated at the immediate sealing areas or joint. That is, the mouth or neck portion of the resinous container part is employed in such a manner with the lid part that a resilient or elastic, pressing-in, sealing action is attained with the lid along a localized or restricted area whose thickness or extent may not, in itself, be sufficient for the required minimum thickness or section of the mouth portion. In this manner, the interface of, for example, a localized area of the lip edge or the other sealing portion of the resinous part is flattened-out into an abutting sealing area that is annularly continuous and defines a continuous sealing contact between the lid part and the resinous part.

In employing my invention, I provide a lid such as 11 that may be made of metal or a resin, but that has greater rigidity or density than the material that is formed into the jar or container 10. With particular reference to FIGURES 2, 3 and 4, I have shown a light-weight, hollow container or jar 10 having side and bottom walls defining a suitable cavity or chamber therein for receiving the material to be stored, and having an open mouth, neck or lid mounting portion at its opposite or open end. As previously mentioned, this container is of an expanded resin, such as polystyrene, and has a main body side wall thickness 15 and a reduced thickness as to its open mouth or lid-mounting portion. The lid mounting or open end mouth portion has a lower shoulder or inwardly-offset horizontal ledge 16 which is connected through a vertical or upright, rounded thread land portion 17 and a vertical portion 18, to a rounded and peripherally-outwardly projecting thread land portion 19. An upper planar end portion 18a of the thread valley terminates in a horizontal rim edge or lip face 20 that carries, somewhat centrally of its width or thickness, an upright or raised, rounded ridge, resilient sealing annulus or ledge 21.

In the embodiment of my invention shown particularly in FIGURES 2 to 4, inclusive, I provide the container 10 with an upright, raised, rounded ridge, sealing annulus or rim 21 that is shown located substantially at a mid or central position as to the thickness of the lip face 20 of the open mouth portion of the container and which, as formed, is of rounded section (see FIGURES 2 and 3), is capable of providing a restricted, flattened sealing shape or area 21' when pressed into a sealing position (such as shown in FIGURE 4), and will elastically return to its original shape when the pressure of the lid 11 is released by unscrewing it.

A cup-like lid 11 of metal or other suitable material is shown provided with an end wall and a continuous side or flange wall 13 of circular or annular shape. The inner side of the wall 13 has a rounded thread land portion 13a for cooperating with the thread valley portions 18 and 18a and land portions 17 and 19 about the outside of the container mouth or neck portion, so as to threadably latch and hold the two members or parts in a desired screwed-on relationship with respect to each other. It will be noted that the side wall 13 has a relatively wide spacing with respect to the side wall of the mouth portion of the container 10 and that its land 13a forms somewhat of a tangential rolling contact with lands 17 and 19 of the container to minimize wear and tear on the threads, prevent cutting action, and allow for a somewhat resilient or flexible mounting of the lid in position.

In the embodiment shown in FIGURE 5, the sealing action for the joint is effected between a lower, rounded, lip end or rim edge 14'a of the side flange of the lid 11 and the ledge or shoulder portion 16 of the container body. When the lid 11 is in its screwed-on position shown in this figure, its rim edge 14'a is, in effect, held in a resilient sealing position by the shape-conforming action of the contacted and pressed-in annular area 16' of the ledge 16. When the lid 11 is screwed-off, the resiliency of the material of the container 10 causes the ledge 16 to assume its original shape, so that an effective sealing action is effected and maintained each time that the lid is screwed-on.

In FIGURE 6 of the drawings, I have shown a construction which employs both a surmounting sealing ledge 21 adjacent the outer terminus of the latching or screw thread portions of the open mouth portion, and a sealing shoulder ledge 16 adjacent the inner terminus of the latching portions. Such ledges, in their deformed positions, have been labelled 21' and 16'. It will be noted, in the embodiments of FIGURES 5 and 6, that the side flange wall 13 of the lid 11 is lengthened somewhat, so that an abutting contact is made with the ledge 16 when the lid is laid on the mouth of the container 10, preliminary to screwing it down in position thereon. That is, the depth extent of the open mouth portion of the container is less than the depth extent of the side flange of the lid. As compared to this, see FIGURES 3 and 4, the rim edge 14a is in a spaced or out-of-contact position with respect to the ledge 16, both when the lid 11 is in its initial and in its final positions with respect to the container 10. In this case, the depth extent of the open mouth portion of the container is greater than the depth extent of the side flange of the lid.

In FIGURE 7, I employ a lid 11 whose top or end closure portion 12 is provided with an annular fold, ledge, rounded ridge or offset wall portion 12a that projects from the inside thereof and which, when the lid 11 is in its screwed-on position, will be forced into the interface of the lip edge 20 to define a resilient sealing groove 20a therein. I have shown the annular offset 12a as positioned substantially centrally or intermediate the wall thickness of the neck portion of the resinous part or container 10, so that maximum flexibility is provided without damage to the edge face 20 which is normally of the planar shape of FIGURE 5 before the lid is mounted in position.

Containers or jars of my invention may have their lids screwed on the containers by suitable automatic equipment, at the factory, after the cream, liquid or other material has been added to their cavities or chambers. I prefer to modify such equipment to provide the rotating gripping and turning means for the lid with adjustable tension springs to provide a down-pressure application during the screwing-down operation and while the container is gripped to hold it stationary. For example, a pressure of about 2 to 20 pounds, 10 to 20 pounds, as an optimum, may be applied during the screwing-down operation to aid in deforming either the ledger 21 or the ledge 16 or both of them to the shapes 21' and 16', respectively, before pressure is released. This is helpful and avoids stripping the rather resilient threads of the container mouth portion when the lid is given its initial, tight, screw-down relationship, prior to storage of the containers for shipment and sale to the ultimate consumer. After the lid is in position, the pressure is released, and the interlatching portions or threads then maintain the sealing ledge in a resiliently resisted position to provide a sealing-off joint between the lid and the container.

It may be noted that a container produced from expanded pellets of a resin, such as polystyrene, may have a density of ½ to 20 pounds per cubic foot, as compared to a density of about 60 pounds per cubic foot for pure pressure-molded polystyrene. A container thus produced is favorable in cost to a container formed of paper or wood fiber materials and has about 1/15 the weight of a conventional plastic molded product.

Since the downward force exerted during the screwing-down operation must avoid damage to or stripping of the threads, I have found that the expanded resin material, when formed into the jar or container, should have a density of at least 3 pounds per cubic foot. This minimum density is also important from the standpoint of providing a sufficiently strong mouth or neck portion with threads or latching means, and of providing a sufficient sealing pressure on the localized sealing area, such as provided at the projecting annulus ledge 21 or shoulder ledge 16.

I conducted tests to determine the effective sealing action of a container sealed in accordance with my invention (see FIGURE 4), as compared with a container using the same type of material for its body and the same type of lid, but without the ledge portion 21, such that any sealing action was only effected between the lid and the flat lip edge 20 of the mouth portion of the container. Each jar had been previously partially filled with five grams of water and their respective lids were screwed on with the same pressures being applied. Both were maintained at 67° F. in an atmosphere of 45% relative humidity. Both were weighed from time to time to measure the loss of water from the containers due to moisture vapor transmission at the lid seals or joints. The jar providing a sealing action on the lid edge 20 showed a loss of .17 gram in 30 hours, as compared to a loss of .01 gram in the same period for a container having the annulus 21. This illustrated the unquestioned superiority of the sealing action afforded by a container or jar constructed and employed in accordance with my invention.

I have found that, if some weight or pressure force is exerted on the lid as it is screwed on the container, the rim annulus 21 or ledge 16 is properly deformed to conform to the lid, and stripping of the threads by excess pressure on them is prevented. Upon release of this down pressure on the lid, the elasticity of the container at its threads maintains pressure at the restricted sealing area, thus assuring a tight joint-sealing action. In a container of a type such as mentioned in the example above, wherein the sealing action is directly effected between the full thickness extent of the lip edge 20 of the container wall, a tight seal cannot be obtained, since the threads are not rigid enough to obtain a high enough screw-on pressure at the seat between the lip edge and the lid. It will be noted that in my construction, the annular sealing area which is employed to compression-compact and close-off substantially immediate interstices, or interstice areas of the expanded resin bead structure, extends on a longitudinal or vertical compression axis that is parallel to a longitudinal axis of the open mouth wall portion, is symmetrical about its longitudinal compression axis and is pressed-in, engaged on and compacted substantially symmetrically about or along such axis.

In FIGURE 8, I have somewhat diagrammatically shown a section through the resinous part or container body 10 under considerable magnification to somewhat diagrammatically indicate its inherent nature. It will be noted that the expanded beads a, b, c, d, etc. have areas of cohesion interspersed with adjacent beads, but define interstices, crevices, or spaces which become exposed on an interface or a surface of the article and thus, complicate obtaining a fluid-tight or moisture-proof seal with a lid element or part 10.

What I claim is:

In a light weight and relatively soft wall container for use with a relatively rigid closure lid of cup-shaped construction having a side flange provided with a rounded-land latching thread portion and also having a localized annular sealing surface area, a container body of a density of about 3 to 20 pounds per cubic foot having an expanded resin bead structure with areas of cohesion and interstice areas interspersed therewith, said body having a side wall extending on a longitudinal axis and defining a material-receiving cavity therein, said body having an open mouth wall portion at one end of the side wall of the same expanded bead structure and terminating in an annular lip face which is substantially normal to the longitudinal axis of said side wall, said open mouth wall portion having a longitudinal axis extending from the longitudinal axis of the side wall of said body, said open mouth wall portion having a rounded-land latching thread portion therealong that terminates adjacent said lip face and cooperates with and defines a somewhat tangential rolling contact surface with the latching thread portion of the closure lid for lid-mounting engagement therewith, an outwardly-offset, completely rounded, annular sealing ledge having a relatively wide base portion co-planar with said lip face and integral with said open mouth portion; said ledge terminating at its outermost portion in a localized sealing surface area of substantially reduced width with respect to said base portion, said sealing ledge being resilient and of the same expanded resin bead structure as said body, said sealing ledge further being of lesser widthwise extent than said annular lip face and being centrally disposed with respect thereto, said sealing ledge being symmetrical in a longitudinal cross-section of said container and about a compression axis which is parallel to the longitudinal axis of said open mouth wall portion for pressing-in engagement on and compaction along said longitudinal compression axis by the localized sealing surface area of the closure lid to form an annularly-continuous, increased contact area and fluid-tight sealing juncture therebetween, one of said localized sealing surface areas defining a substantially flat annular contacting surface and the other defining a projecting substantially rounded annular contacting surface, and the contacting surface of said annular sealing ledge being compacted-inwardly by the contacting surface of the closure lid to close-off substantially immediate interstice areas of its expanded resin bead structure and provide an effective continuous fluid-sealed-off joint relation with the closure lid when the rounded-land latching thread portion of the closure lid is screwed-down on said open mouth wall portion in a latching relation with the rounded-land latching thread portion of said open mouth wall portion.

References Cited in the file of this patent

UNITED STATES PATENTS

| 2,362,421 | Von Till | Nov. 7, 1944 |
| 2,484,608 | Cheyney et al. | Oct. 11, 1949 |
| 2,772,017 | Rieke | Nov. 27, 1956 |
| 2,805,006 | Henchert | Sept. 3, 1957 |
| 2,876,926 | Gronemeyer | Mar. 10, 1959 |
| 2,942,301 | Price | June 28, 1960 |
| 2,950,033 | Henchert | Aug. 20, 1960 |

FOREIGN PATENTS

| 209,870 | Australia | Aug. 21, 1957 |
| 788,148 | Great Britain | Dec. 23, 1957 |
| 215,484 | Australia | June 10, 1958 |
| 812,090 | Great Britain | Apr. 15, 1959 |